United States Patent
Brugger et al.

(10) Patent No.: US 6,544,775 B2
(45) Date of Patent: Apr. 8, 2003

(54) AUTOMATED MACROMOLECULE SYNTHESIZING PROCESS AND DEVICE

(75) Inventors: Hermann Brugger, Illerkirchberg (DE); Christian Rembe, Ulm (DE); Raoul Bader, Mainz-Laubenheim (DE); Eberhard P. Hofer, Lonsee (DE); Hartmut Seliger, Elchingen (DE)

(73) Assignee: Merckle GmbH, Blaubeuren (DE)

( * ) Notice: Subject to any disclaimer, the term of this patent is extended or adjusted under 35 U.S.C. 154(b) by 0 days.

(21) Appl. No.: 09/355,974

(22) PCT Filed: Feb. 23, 1998

(86) PCT No.: PCT/EP98/01030
§ 371 (c)(1),
(2), (4) Date: Nov. 4, 1999

(87) PCT Pub. No.: WO98/36828
PCT Pub. Date: Aug. 27, 1998

(65) Prior Publication Data
US 2001/0049099 A1 Dec. 6, 2001

(30) Foreign Application Priority Data
Feb. 21, 1997 (DE) .......................................... 197 07 000

(51) Int. Cl.⁷ .............................................. C12M 1/34
(52) U.S. Cl. ..................... 435/287.2; 436/94; 536/23.1; 536/25.3
(58) Field of Search .............................. 435/287.2, 91.1, 435/183; 536/23.1, 25.3; 436/94

(56) References Cited

U.S. PATENT DOCUMENTS 5,554,501 A * 9/1996 Coassin et al. ................. 435/6
5,582,801 A * 12/1996 DeWitt et al. ............... 422/131

FOREIGN PATENT DOCUMENTS

| DE | 42 06 488 A1 | 9/1993 | |
|---|---|---|---|
| EP | 0 385 433 A2 * | 9/1990 | ............ C07K/1/04 |
| WO | WO 93 17785 | 9/1993 | |
| WO | WO 95 11748 | 5/1995 | |
| WO | WO 96/15450 | 5/1996 | |
| WO | WO 97 26986 | 7/1997 | |

OTHER PUBLICATIONS

Seliger et al., "Surface reactive polymers for special applications in nucleic acid synthesis," Reactive & Functional Polymers, vol. 26, 1995, pp. 119–126.*
Reactive & Functional Polymer 26 (1995) pp. 119–126.
Nucleosides & Nucleotides, 16 (5&6) (1997) pp. 829–833.
Nucleosides & Nucleotides, 16 (5&6) (1997) pp. 835–842.
Analytical Biochemistry 243, (1996) pp. 218–227.
Analytical Biochemistry 224, (1995) pp. 110–116.

* cited by examiner

Primary Examiner—B. L. Sisson
(74) Attorney, Agent, or Firm—Bacon & Thomas

(57) ABSTRACT

The invention relates to a device and to a process for the automatic synthesis of macromolecules on a tape-like substrate material (11). The device has at least one synthesis module (12) which can be sealed from the outside and comprises reaction chambers (15) and fluid lines (18, 19) for filling and emptying the reaction chambers (15) with and of reaction media, it being possible to introduce the substrate material (11) into the synthesis module (12) and bring it into contact with the reaction chambers (15). Transport means (20–26) which are intended to move the substrate material (11) through a particular distance and can be actuated by a control device are furthermore provided. The invention also relates to the use of such a device for the synthesis of oligonucleotides bound on a functionalized substrate material, in particular the production of oligonucleotide libraries.

15 Claims, 5 Drawing Sheets

AUTOMATED MACROMOLECULE SYNTHESIZING PROCESS AND DEVICE

Figure 1:
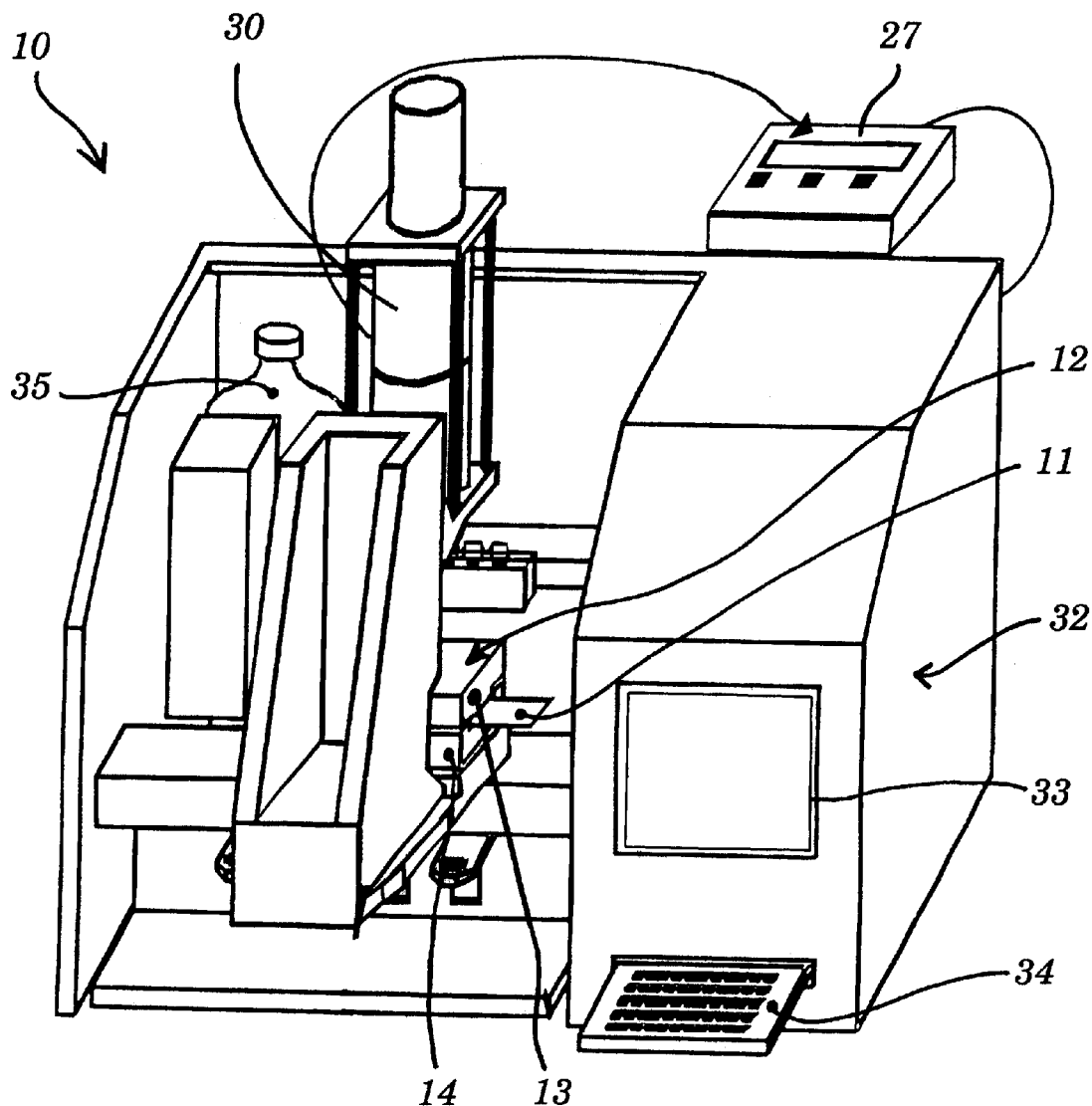

The invention relates to a device and to a process for the automatic synthesis of macromolecules, in particular oligonucleotides, and to the use of such a device.

Synthetic oligonucleotide sequences are routinely produced in machine-assisted processes. Nucleoside amidophosphites, nucleoside H phosphonates or other monomer or oligomer building blocks of biological or abiologically modified nucleic acids which are described in the literature are in this case used as synthons (Sonveaux, E. (1986) *Bioorg. Chem.* 14, 274–325; Uhlmann, E. and Peyman, A. (1990) *Chem. Rev.* 90: 544–584). The synthesis operations are as a rule carried out with solid phases. Typically, the automatic instruments used for the oligonucleotide synthesis operations are designed in such a way that the substrate materials are used in granulated form. With these as a solid bed in a column, reagents, solvents and other liquid phases flow through them. In a similar way, membranes are used as solid phases which can be washed thoroughly. The liquid phases are generally metered with time control using a process computer in a commercially available synthesis machine. The chain propagation takes place in steps. For each addition of a monomer, a multi-stage reaction cycle is carried out. The yield obtained in a chain propagation cycle is generally measured on separation of the protective group by spectroscopic or other analytical methods.

Examples of granulated substrate materials in common use include silica gel, controlled pore glass, polystyrene, composite materials, etc. in the form of irregularly shaped articles or spheres of varying diameter. For macroporous non-swellable substrate materials, concentrations of the order of 0.8–0.9 $\mu$mol nucleoside/m$^2$ external and internal surface area have been measured, irrespective of the material (Kotschi, U. (1988) *Dissertation, University of Ulm, Germany*). Routinely, batches in the region of about 0.2 $\mu$mol to 1 $\mu$mol of growing chains are run in machines.

The simultaneous synthesis of a plurality of oligonucleotide sequences can, on the one hand, on purely preparative basis be carried out by increasing the number of columns filled with polymer substrate which are to be operated, and on the other hand substrate-filled cartridges may be incorporated, for example in a stackable arrangement, in parallel in synthesis cycles of, the same type (Seliger, H. et al. (1989) *Bioengineering* 6: 144–147).

Recently, surface-functionalized two-dimensional materials have also frequently been used as substrates for parallel oligonucleotide synthesis operations. These include glass plates (Maskos, U. and Southern E. M. (1992) *Nucleic Acids Res.* 20: 1679–1684), silicon wafers (Pease, A. C. et al. *Proc. Natl. Acad. Sci. USA* 91: 5022–5026), as well as surface-functionalized polypropylene sheets (Matson, R. S. et al. (1994) *Analytical Biochemistry* 217: 306–310). The aim with all these substrate methods involves fitting the largest possible number of "synthesis" points on a given substrate area, in order thereby to pursue analytical/diagnostic goals.

The number of oligomer sequences to be synthesized in parallel is limited, in the case of conventional commercially available synthesis machines, on the one hand by the equipment outlay and on the other hand by the arrangement of the substrate elements in the stack. Permanent utilization of the available instrument capacity is therefore not possible because of idle times, since the individual cartridges always need to be manually taken from the synthesis machine and re-connected.

In the two-dimensional substrates used for analytical/diagnostic goals, the amounts of oligonucleotides synthesized per "pixel" are extremely small (in the lower picomol range), that is to say normally unsuitable for preparative purposes. Furthermore, the purity of the oligonucleotide material grafted onto a "synthesis point" is limited by the resolution of the "pixels", that is to say it is generally very difficult to prevent one oligonucleotide synthesis "spreading" to neighbouring synthesis points.

In contrast to these works, the inventors of the present application even earlier prepared polypropylene sheets by chemical surface functionalization in such a way as to allow nucleoside concentrations of 5–7 nmol/cm$^2$ (50–70 $\mu$mol/m$^2$). Such two-dimensional substrates which are loaded with extremely high concentrations, although exclusively on the surface, make it possible to carry out oligonucleotide synthesis operations on surface segments in the cm$^2$ range and, this being the case, to produce a sufficient quantity of nucleotide sequences for biochemical/preparative studies (Seliger, H. et al. (1995) *Reactive & functional polymers* 26:119–126). The extraordinarily good accessibility of the surface concentration for dissolved reagents has been demonstrated by the synthesis of an oligonucleotide comprising 200 bases in a single synthesis operation (Bader, R. et al. (1997) *Nucleotides & Nucleosides* 16: 829–833).

German patent document DE 42 06 488 A2 describes a device for carrying out simultaneous or sequential chemical reactions, which consists of four rods which are placed on top of one another and whose contact surfaces form an air-tight seal.

European patent application EP 0 385 433 A2 describes a device for continuous polymer synthesis, in which a tape-like substrate sheet is passed through a plurality of dipping baths.

WO 96/15450 describes a microelectronic semiconductor array which is subdivided in grid fashion into individual reaction fields. Reagents can be applied to the individual fields.

An article by J. Weiler et al. (1996, *Analytical Biochemistry* 243: 218–227) describes a device for oligonucleotide synthesis and its application in DNA sequencing. A polypropylene sheet is brought into contact with elongate reaction chambers. After a first reaction step, the sheet is rotated through 90° and a further coupling reaction is carried out.

An article by R. S. Matson et al. (1995, *Analytical Biochemistry* 224, 110–116) describes oligonucleotide synthesis on polypropylene substrates and its application in the location of genetic defects.

In the dissertation by Raoul Bader, University of Ulm, Germany, 1996, a manually actuable device was described, with the aid of which oligonucleotides can be synthesized on a functionalized tape-like substrate sheet with the use of a conventional synthesis machine (the most important results of this dissertation were described in brief by R. Bader et al. in *Nucleosides and Nucleotides,* 16, 835–842 (1997)). The device described there and in Bader's dissertation has a synthesis module which can be sealed from the outside and comprises reaction chambers and fluid lines for filling and emptying the reaction chambers with and of reaction media, it being possible to introduce the tape-like substrate material into the synthesis module and bring it into contact with the reaction chambers by pressing two elements of the synthesis module together.

When the two module elements are again released from one another, the sheet tape can be transported forwards through a particular distance which corresponds to the separation between two synthesis chambers. By transporting the substrate sheet, for example a polypropylene strip, a linear sequence of synthesis fields can be produced on the strip, which contain either sequentially independent or sequentially overlapping oligonucleotides. With this manual device, it was possible to demonstrate the principal function of the synthesis process proposed by Bader et al. The known device is, however, not suitable for the automatic synthesis of macromolecules on a tape-like substrate material, and in particular the accuracy with which the substrate sheet is positioned in the synthesis module is poor with manual adjustment.

The object of the present invention is therefore to provide a device which allows automatic synthesis of macromolecules on a two-dimensional substrate material, in particular on a tape-like two-dimensional substrate material, and which avoids dead times during the synthesis. The device is, in particular, intended to be capable of carrying out all the necessary steps fully automatically following one-off setting of the process parameters and the desired sequence.

This object is achieved by the device for the automatic synthesis of macromolecules on a tape-like substrate material according to the present main claim.

The device comprises at least one synthesis module which can be sealed from the outside and comprises reaction chambers and fluid lines for filling and emptying the reaction chambers with and of reaction media, it being possible to introduce the substrate material into the synthesis module and bring it into contact with the reaction chambers. According to the invention, the device furthermore comprises transport means which are intended to move the substrate material through a particular distance and can be actuated by a control device.

According to the invention, it is accordingly proposed to provide controllable transport means which allow the substrate material to be moved through a particular distance. In this case, the control device preferably interacts with a synthesis machine, known per se, which provides the necessary reagents for the condensation of the monomers onto the sequence which is being formed on the substrate tape and controls and monitors the overall reaction cycle. After each condensation step, the synthesis machine sends a signal to the control device for the transport means, and the tape is transported forward through a particular distance which corresponds precisely to the spacing of the reaction chambers in the synthesis module. If the reaction chambers are arranged linearly in the direction of movement of the substrate tape, then—apart from the first synthesis chamber in the movement direction—all the synthesis chambers lie on fields of the sheet where the coupling of a monomer was carried out in the preceding step.

The substrate material used may, for example, be a polypropylene sheet (PP sheet) which has been subsequently functionalized on the surface. During this functionalization, hydroxyl groups at which the oligomer synthesis can be carried out are inserted on the surface. During a coupling step, the reaction chambers must be capable of being readily and completely filled with the required reagents and emptied. During the oligonucleotide synthesis, for example during the coupling of a nucleoside phosphoric acid ester amide, care must be taken to work under stringently non-aqueous conditions, whereas water is needed in the subsequent oxidation step. The reaction chambers must also be capable of being sealed as well as possible from the outside, and in particular care must be taken to work under absolutely air-tight conditions during the oligonucleotide synthesis.

The transport means preferably comprise a first motor-driven traction means which is arranged behind the region where the substrate material emerges from the synthesis module. This may, for example, be two rollers which can be pressed against one another and between which the substrate tape is clamped. One of the rollers may be driven using a motor, so that the substrate tape is transported when the motor is actuated. If the substrate tape is a relatively flexible sheet, then one-directional transport of the substrate tape is possible with such an arrangement. If the substrate is relatively rigid, then two-directional transport can be obtained by switching over the running direction of the motor.

The control device may, for example, be a special microcontroller. It is, however, also possible to use a correspondingly programmed conventional computer, for example a laptop or a workstation with a suitable interface.

According to an advantageous embodiment of the device according to the invention, the transport means furthermore comprise a second motor-driven traction means which is arranged in front of the region where the substrate material enters the synthesis module.

According to this embodiment, two-directional transport of the tape can be carried out even in the case of a flexible sheet. Depending on the direction in which the tape is being moved, one traction means works as a drive, while the traction means arranged on the opposite side of the synthesis module is operated in idle mode. In the case of two-directional transport of the tape, oligomer sequences whose length corresponds to a multiple of the number of reaction chambers can be synthesized. Compared with increasing the number of reaction chambers, oligomer sequences with a smaller overlap range may thus be synthesized, for example.

Irrespective of whether only one traction means or two tractions means are provided the roller pair which is only being used as a guide will preferably have some degree of friction so that the tape is always transported under some degree of tension.

The traction means are preferably driven by stepper motors. With stepper motors, precise and reproducible moving and positioning of the substrate tape can be achieved. The control device may in this case carry out absolute displacement by specifying a particular number of steps of the motor for a particular displacement. It is, however, also possible to use a substrate tape which is provided with tape marks, so that the exact position of the tape can be monitored, for example using optical sensors whose signals are in turn processed by the control device.

According to an advantageous embodiment, the synthesis module has sealing lips in the regions where the substrate material enters and emerges, respectively. In a simple embodiment of the device according to the invention, the synthesis module may be sealed using sealing lips which are provided directly on the regions where the substrate tape enters and emerges, respectively.

In a particularly preferred variant of the device according to the invention, each synthesis module comprises at least two module elements which can move relative to one another and are respectively assigned to the upper and lower sides of the substrate tape, at least one module element being connected to an actuating means which can be actuated by the control device and makes it possible to press the two module elements tightly against one another in such a way that they can be released. If, as in the case of oligonucleotide synthesis, care must be taken to ensure a complete air seal, a two-piece design of the module elements is preferable. The two module elements may in this case be moved against one another and enclose the upper and lower sides of the substrate tape between them. In order to transport the substrate tape, the module elements are released and the tape is free to move between them. In order to carry out a synthesis step, the module elements are pressed against one another by actuating means, so that on the one hand the substrate tape is fixed in this position and, on the other hand, the reaction chambers are hermetically sealed from the surroundings. The actuating means are likewise actuated by the control device, so that automatic coordination of the releasing of the module elements and the transporting of the substrate tape is ensured.

The reaction chambers are customary arranged in one of the module elements. If, however, macromolecules are to be synthesized in parallel on both sides of the substrate tape, reaction chambers are preferably provided in both module elements.

The actuating member is preferably a pressure cylinder, for example a pneumatically or hydraulically actuable cylinder. The pressure cylinder may be of double-acting design, that is to say the cylinder piston has pressure applied to it in both working directions. It may also be spring-loaded.

In an advantageous embodiment, each reaction chamber has an inlet opening and an outlet opening, via which the reaction chamber communicates with the fluid lines. If the reaction chambers are of elongate design, the openings are preferably located at the ends of the chambers.

The fluid lines for the delivery and discharge of the reaction media may, for example, be designed as manifold lines which split off into lines to the individual chambers. Preferably, however, a connecting channel is provided between at least two reaction chambers.

Advantageously, the reaction chambers and their connecting channels are arranged in meander fashion.

The present invention also relates to the use of the device described above for the synthesis of oligonucleotides bound to a functionalized substrate material.

It is primarily suitable for the production, of oligonucleotide libraries, in particular for the production of oligonucleotide libraries with overlapping sequences.

A particularly preferred use is to be found in the production of diagnostic test strips.

It is also suitable for the production of test strips for DNA sequencing.

Lastly, the invention relates to a process for the automatic synthesis of oligonucleotides on a substrate tape using a synthesis device having a synthesis module comprising at least two module elements, in which the substrate tape is transported into the synthesis module and positioned there, the synthesis module is sealed from the outside by pressing the two module elements together, a synthesis step is carried out with the aid of a conventional synthesis machine, the two parts of the synthesis module are then released from one another and the tape is moved forward through a defined distance and re-positioned. According to the invention, the process is fully automated, with a clock signal, which is emitted by the synthesis machine and is receivable by a microcontroller which in turn controls actuators such as stepper motors, pneumatic presses and the like, being utilized for controlling and coordinating the transport and positioning of the substrate tape, the pressing of the module elements together, each synthesis step and the releasing of the module elements.

The synthesis product obtained is, in this case, because of the chosen dimension of the reaction chambers, chosen in accordance with the concentration of the tape-like two-dimensional substrate in such a way that there is sufficient material for virtually all further uses of the product.

Through using the two-dimensional substrate, fast and cost-efficient synthesis is possible. Using the two-dimensional substrate furthermore makes it possible to obtain high purity of the synthesis product, for which reason it is substantially possible to do without further purification steps. Since the device permits automatic transport of the two-dimensional substrate, the otherwise customary dead times of the synthesis machine are eliminated. Using the two-dimensional substrate with arbitrarily chosen length allows clear-cut allocation and location of the sequences which are produced on the substrate. The device can be operated using a wide variety of synthesis machines, and is therefore universally usable with virtually all instruments available on the market.

Figure 2:
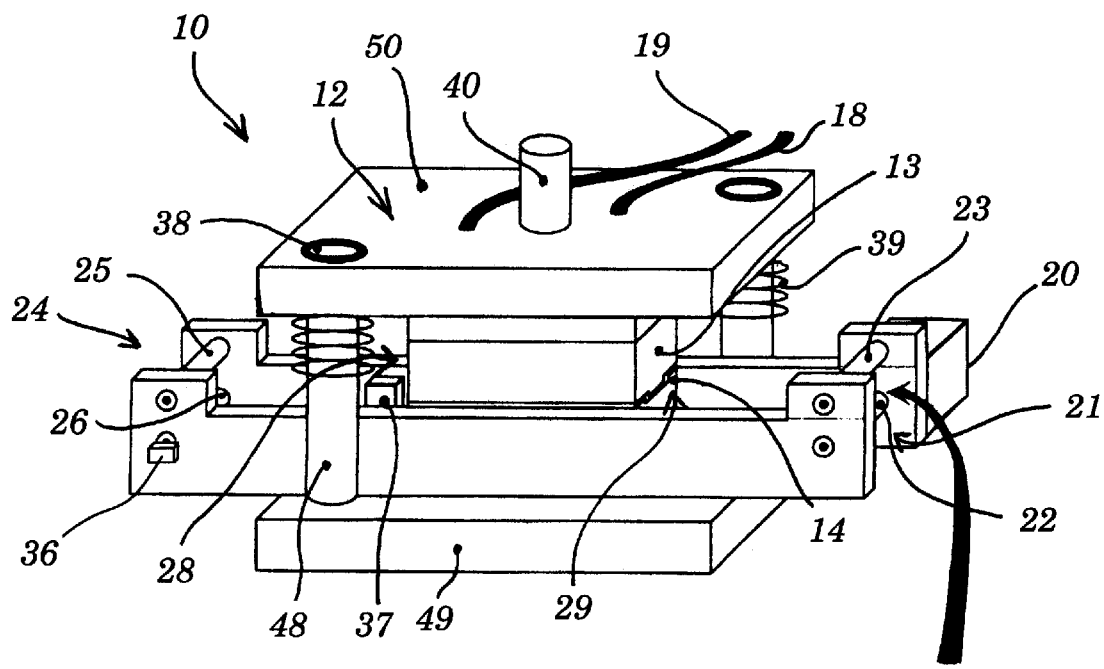
Figure 3:
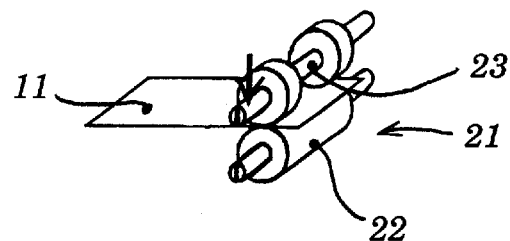
Figure 4:
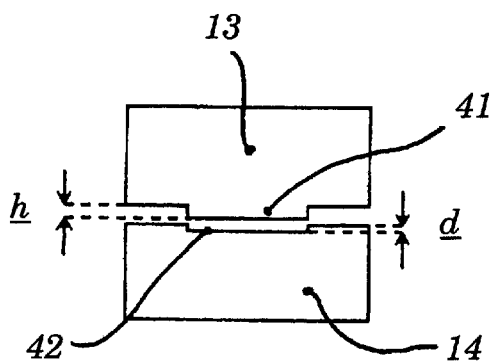
Figure 5:
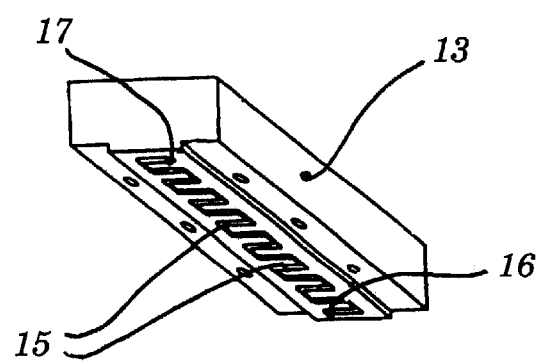
Figure 6:
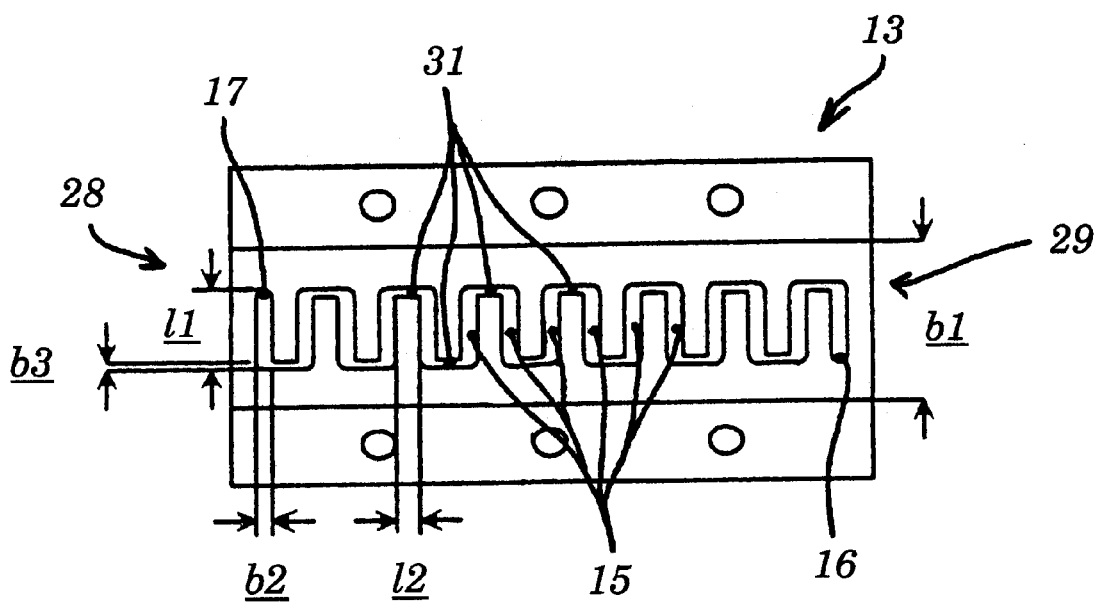
Figure 7:
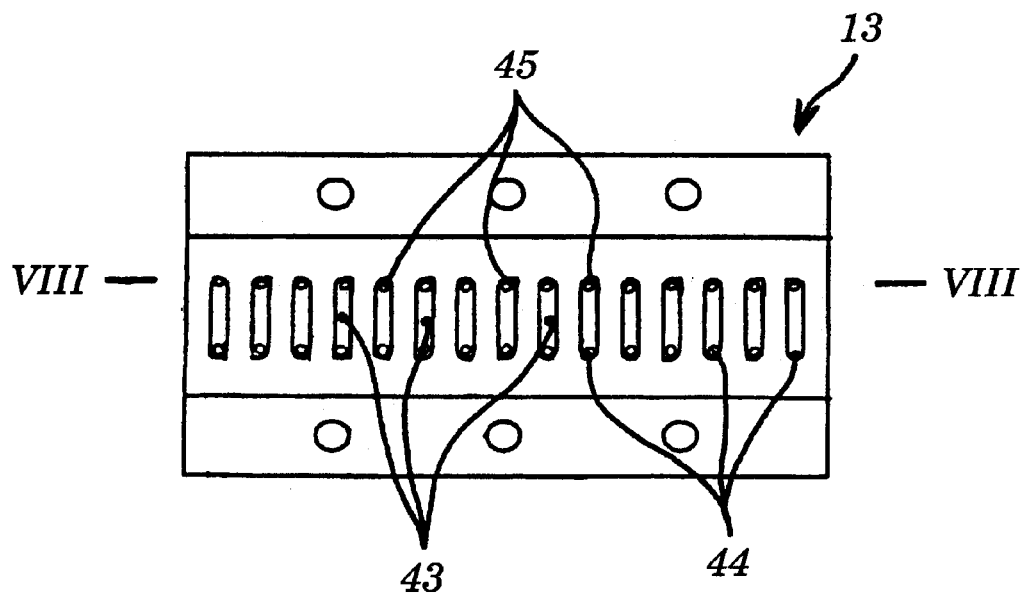
Figure 8:
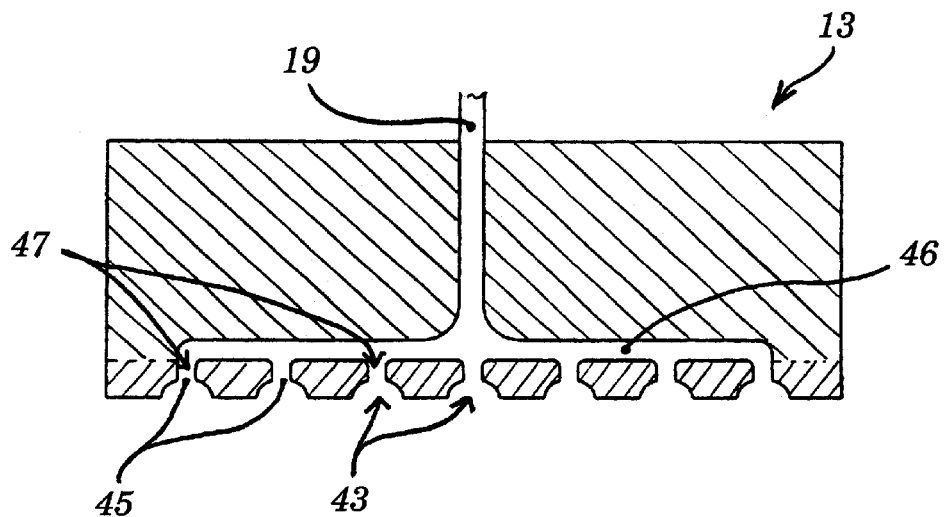
Figure 9:
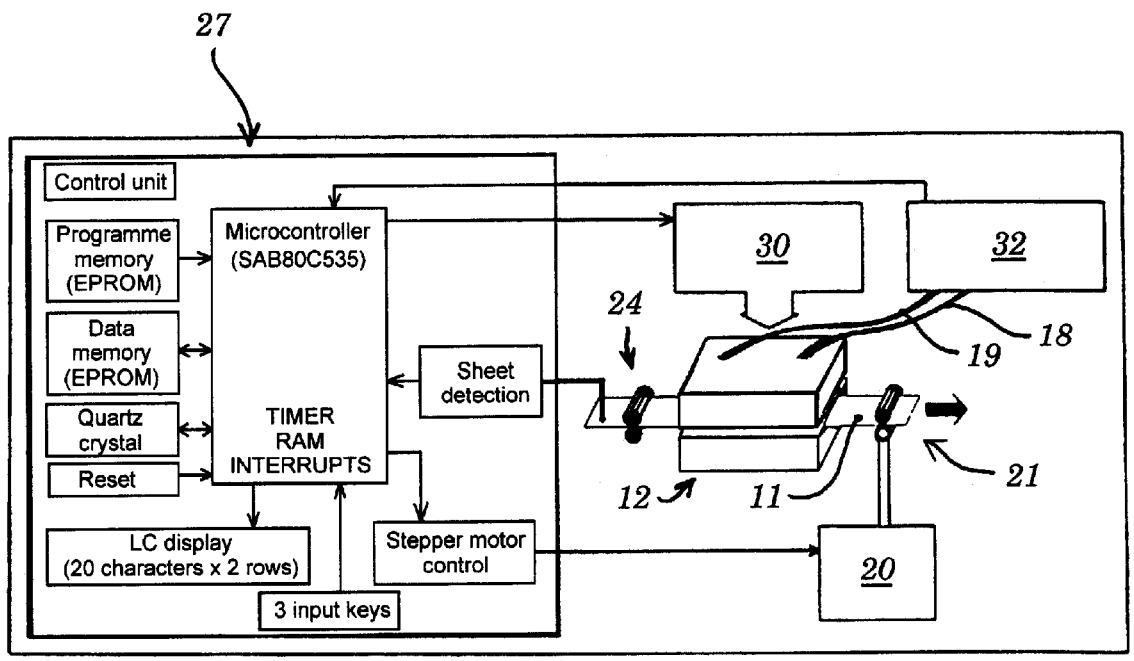
Figure 10:
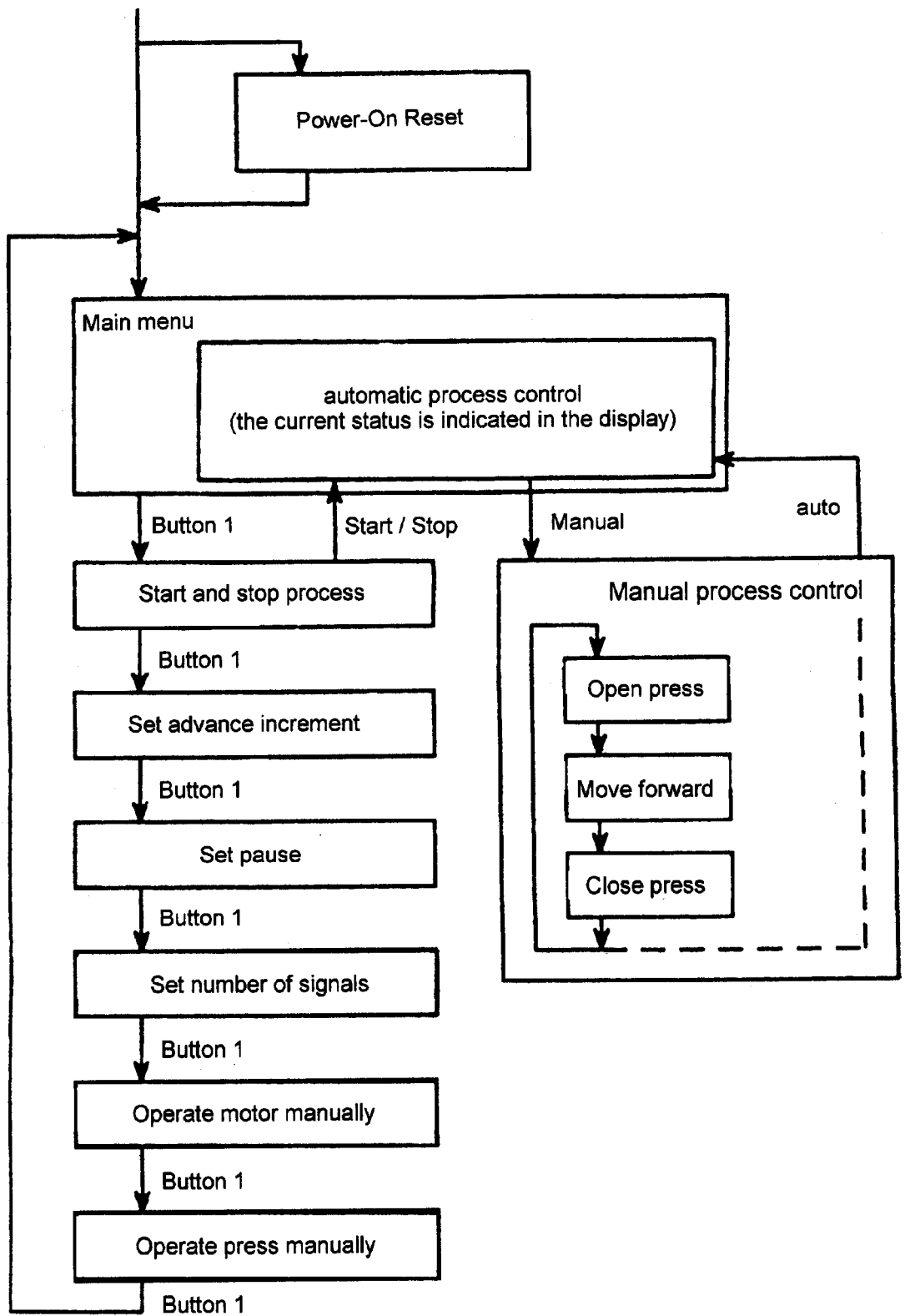

The present invention will be explained in detail below with reference to illustrative embodiments represented in the appended drawings. In the drawings:

FIG. 1: shows a schematic representation of a synthesis device according to the invention, which is connected to a commercially available synthesis machine, the transport means for the substrate tape not being represented for the sake of clarity;

FIG. 2: shows a detailed representation of the synthesis device according to the invention in FIG. 1 with schematically represented transport means for the substrate tape;

FIG. 3: shows a detail of the transport means in FIG. 2;

FIG. 4: shows an end view of a two-piece embodiment of the synthesis module of the device in FIG. 2;

FIG. 5: shows a perspective schematic representation of the mobile upper part of the synthesis module in FIG. 4;

FIG. 6: shows a bottom view of the module element in FIG. 3;

FIG. 7: shows a view, corresponding to FIG. 6, of a variant of the upper module element;

FIG. 8: shows a longitudinal section of the module element in FIG. 7;

FIG. 9: shows an example block circuit diagram which illustrates the process automation of the device according to FIG. 1;

FIG. 10: shows an example flowchart for the process control with the control unit according to FIG. 9.

FIG. 1 shows the basic structure of the synthesis device 10 according to the invention, which is connected to a conventional synthesis machine 32 (Eppendorf/Biotronik Ecosyn D300). The synthesis machine 32 has a display 33 and an operating keypad 34, using which it can be programmed with the required process data and the desired nucleotide sequence. The synthesis machine 32 combines all the chemicals necessary for the oligonucleotide synthesis, controls the required volumes and the overall reaction process. The required chemicals can be pumped to the machine, for example from storage bottles 35.

The synthesis device 10 according to the invention has a synthesis module 12 which consists of a first module element 13 and a second module element 14. The functionalized substrate tape 11 is fed between the two module elements. For the sake of clarity, the transport means for the substrate tape 11 are not represented in FIG. 1. A pneumatic press 30, which interacts with the mobile first module element 13 and presses it against the underlying second module element 14 when a synthesis step is being carried out, can however be seen. The reaction chambers of the synthesis module are thereby hermetically sealed from the surroundings. With the aid of a filter pressure reducer, the pressure force can be adjusted within a wide range. As an alternative, another design of press, corresponding to the prior art, may be used. Before the tape 11 is moved, the first module element 13 is released from the second module element 14, so that the tape is freed. In the example represented, a directly acting pneumatic press with double-acting cylinder is used, that is to say the plunger is moved in both directions by air pressure (press No. 24 from the company Schmidt Feintechnik GmbH, St. Georgen, Germany).

The device according to the invention is represented in more detail in FIG. 2; although without the substrate tape. The first module element 13 and the second module element 14 of the synthesis module 12 are again shown. The synthesis module has an inlet region 28 for the substrate tape, and an outlet region 29. Arranged after the outlet region 29, traction means are shown which consist of a pair of rollers 21 driven by a stepper motor 20. The pair of rollers 21 is furthermore represented in somewhat more detail on an enlarged scale in FIG. 3. The roller 22 driven by the motor and the application roller 23 are pressed slightly against one another (shown by an arrow in FIG. 3). The substrate tape 11 can be fed through between them, as in particular shown by FIG. 3. In the present example, the device 10 is intended for one-directional transport of the sheet tape 11, so that an undriven second pair of rollers 24 is provided as a guide for the tape at the opposite end of the device, that is to say in the vicinity of the region 28 where the substrate tape enters the synthesis module 12. The second pair of rollers 24 consists in turn of an application roller 25 and a compensating roller 26. For two-directional transport, provision could be made to provide either roller 25 or roller 26 with a stepper motor as well, the control unit shown in FIG. 1 causing actuation of one of the two motors depending on the desired direction of advance.

When the substrate tape 11 is being transported, a check is made using a light barrier 37 as to whether the end of the tape has reached the entry 28 of the synthesis module 12. If the substrate tape 11 is finished, the press 30 is closed and the automatic control terminates the process. This ensures that, in the case of unmonitored synthesis, there is always a substrate material 11 in the synthesis module 12.

The synthesis module 12 is in this case located between two steel plates, a baseplate 49 and a bearing plate 50. The first element 13 of the synthesis module 12 is actuated by the pneumatic press 30. To that end, it has a guide bolt 40 for the press. A plunger (not shown) of the press 30 comes to bear against the bearing plate 50. The bearing plate 50 is guided by two brass slideways 38 in which guide pins 48 that are anchored in the baseplate 49 of the synthesis device 10 engage. The bearing plate 50 rests on two sets of cup springs 39 which open the synthesis module 12 with a force of 2.8 kN. Under an air pressure of 6 bar, the synthesis module is sealed with a resultant force of 5.7 kN (force of the press less opposing force of the springs). When the synthesis module is open, the substrate tape 11 can be transported.

FIG. 2 furthermore shows the feed line 18 and the discharge line 19, by which chemicals are fed from the synthesis machine 30 into the synthesis device according to the invention, and are returned from the synthesis module to the machine 30, respectively (see also FIG. 9).

FIG. 4 shows an end view of a two-piece variant of the synthesis module 12. The first module element 13 is mobile relative to the second module element 14. The two module elements preferably consist of polytetrafluoroethylene, so that they are easy to clean and chemically very inert. When the module elements are pressed together, a good seal can be obtained. This is, in particular, assisted by the represented shape in which the upper module element 13 has a projection 41 that has a height h of 2 mm in the prototype represented. The projection 41 can be pressed into an indentation 42 with a depth d of 1 mm in the second module element 14.

FIG. 5 shows a perspective representation from below of the first module element 13. In the projection 41, the reaction chambers 15 are cut out. The reaction chambers 15 can be seen more clearly in the representation in FIG. 6, which is a bottom view of the module element in FIG. 5. In the example represented, the module element has fifteen parallel elongate reaction chambers 15. Each reaction channel has a length l1 of about 10 mm and a width b2 of 2 mm. The width b1 of the projection 41 of the module element 13 is about 20 mm. Connecting channels 31 with a length l2 of 3 mm and a width b3 of 1 mm, which in each case connect the end of a reaction chamber to the start of the next chamber, are provided between the reaction chambers. This gives rise to the meander-shape structure which has been represented, so that connecting channels encounter corresponding synthesis fields on the substrate only at every second synthesis step. Even if the connecting channels are therefore open to the substrate, only sequences with reduced length, which present no problem for the respective intended use of the substrate, are formed in these regions. At the start and end of the meander-like structure of the reaction channels, an inlet opening 16 and an outlet opening 17, respectively, are provided, these openings communicating with the synthesis machine 32 via the fluid lines 18, 19.

The sizes indicated here are intended only to be examples for the described prototype. It is also possible, in particular in the case of non-preparative synthesis operations, to choose substantially smaller dimensions, primarily if materials other than polytetrafluoroethylene are used, for example semiconductor chips with correspondingly etched structures.

FIG. 7 shows a further variant of the reaction chambers of the first synthesis module 13. In contrast to the embodiment in FIG. 6, the individual reaction chambers 43 are not here connected to one another via connecting channels. Instead, each reaction chamber has its own inlet 44 and its own outlet 45.

FIG. 8 represents a section through the module element 13 in FIG. 7 along the line VIII—VIII in FIG. 7. It can be seen that the outlets 45 of each chamber 43 open through distributor channels 47 into a common manifold channel 46, which is in turn connected through the fluid line 19 to the synthesis machine 32. In a corresponding arrangement, although not represented here, the inlets 44 of the reaction chambers 43 are connected through distributor channels and a manifold channel to the fluid line 18, through which reagents are delivered from the synthesis machine 32 into the chambers 43. The represented variant of the module element 13 has the advantage that the individual reaction chambers can be flushed more rapidly with the reagents. It is particularly straightforward to produce such a module element having manifold and distributor channels when it is itself made from two subunits, as has been indicated in FIG. 8 by the different hatching.

FIG. 9 represents a block diagram of an example control unit 27 which, on the basis of signals from the synthesis machine 32, actuates both the pneumatic press 30 and the stepper motor 20. The motor 20 used here moves the sheet 11 in the $\mu$m range. Together with a commercially available synthesis machine, the device according to the invention automatically produces oligomers. The control unit 27 consists of a microcontroller circuit with input keys, display, motor control, program and data memories and interfaces for the press and synthesis machine. The microcontroller, which controls the timing of the synthesis, communicates with the synthesis machine and influences the actuators such as motor and press. Appropriate drive software is created for the control procedure. In this case, program parts are divided up into individual segments according to their functions. This provides very universally usable subroutines which, for example, fully undertake the driving of the display or the data memory. In order to keep the program open to other applications, process steps which allow highly variable use of a wide variety of synthesis modules are incorporated in the program. The program may, for example, be permanently stored in a memory, for example an EPROM of the control unit. This memory keeps the data even when the electricity supply is turned off. The microcontroller chosen here is, for example, the Siemens SAB80C535 (High-Performance 8-Bit CMOS Single-Chip Microcontrollers SABB0C515/80C 535, Data Sheet, Siemens AG, Munich, 1995). This controls the entire running of the process.

FIG. 10 represents a typical flowchart for the automatic synthesis process. When turning on, the opportunity is available to set special parameters in a power-on reset menu. These parameters are the substrate advance increment and counters or timers for the running of the process. Once the machine has been started, no more changes can be made in the parameter menus. This status is indicated by a light-emitting diode. The user is then prompted to close the press and start the synthesis machine. The current status of the control unit is thereafter indicated in the main menu, which is reached automatically after starting. It is possible to change to manual process control using a key. In the automatic operating mode, however, the further running of the process is controlled automatically by the interplay of the microcontroller and the synthesis machine.

Preferred application examples of the device according to the invention will be described below:

EXAMPLE 1
Automatic Synthesis of Successive Sequentially Independent Oligonucleotide Fields By coupling a commercial synthesis machine 32 to the synthesis device 10 represented by way of example in FIGS. 1 and 2, parallel synthesis of oligonucleotides, whose sequence is arbitrarily selectable, can be carried out on a two-dimensional substrate, for example a sheet tape 11. If, for example, a four-column instrument is used, four mutually independent linearly arranged synthesis modules 12 can be connected to the machine 32. It is also conceivable to provide independent reaction chambers or groups of reaction chambers within one module. With the device according to the invention, the modules (or the module) with the integrated independent reaction chambers and the two-dimensional substrate located in between are closed off absolutely leaktightly from the outside and the synthesis machine carries out the parallel synthesis on the two-dimensional substrate in the independent fields (reaction chambers). After all four parallel synthesis operations are finished, the device according to the invention receives a defined signal from the synthesis machine 32, which enables the control unit 27 to open the module 12 and transport the two-dimensional substrate 11 from the synthesis module to an extent such that each field is then provided with a new section of the two-dimensional substrate 11. An example which may be mentioned is that the reaction fields (chambers) have a width of 1 cm and are at a distance from one another of also 1 cm. In the case of four fields, the substrate must accordingly be transported forward by 4×(1 cm+1 cm)=8 cm. Since the two-dimensional substrate can be provided in any desired length, uninterrupted synthesis is therefore possible. In similar fashion to a tape cassette recorder, the two-dimensional substrate can then be fed through the machine, the tape being in each case paused for the synthesis and capable of being fed forward after the synthesis is fully finished.

EXAMPLE 2
Automatic Synthesis of a Succession of Oligonucleotides with Overlapping Sequences The automation with the device according to the invention can also be applied to a process for producing oligonucleotides with overlapping sequences. In this process, it is necessary to transport the two-dimensional substrate forward by an exact length after each coupling operation. By using an automatic machine this transport can then be carried out automatically. The synthesis of an arrangement of sequentially overlapping oligonucleotides over a prolonged period of time without further monitoring by the operator of the system is therefore possible.

EXAMPLE 3
Process Automation

In order to ensure straightforward operation and flexible usability of the device according to the invention, a control procedure is produced with a microcontroller. A synthesis module 12, which may consist of any desired material that is inert with respect to the chemistry employed, for example polytetrafluoroethylene (PTFE), is used as the reaction chamber 15 for the chemical synthesis. The oligomers are synthesized on a two-dimensional substrate 11 (for example a functionalized polypropylene sheet), which is contained inside the synthesis module 12. In order to ensure that the reaction chamber 15 is absolutely leaktight, the synthesis module 12 is sealed using a press 30. The chemical steps needed for the synthesis are programd on the synthesis machine 32, it being possible to emit trigger pulses for the control unit at defined points. The two-dimensional substrate 11 may in this case be automatically positioned very precisely using a motor 20. A stepper motor was used here for the transport. The two-dimensional substrate 11 is in this case placed between two rollers, one of which is driven by the motor via a simple gear.

What is claimed is:

1. A device for the automatic synthesis of oligonucleotides on a tape-like substrate material having at least one synthesis module which can be sealed from the outside and comprises at least one reaction chamber and fluid lines for filling and emptying the reaction chamber with and of reaction media, it being possible to introduce the substrate material into the synthesis module and bring it into contact with the reaction chamber and having transport means which can be actuated by a control device and are intended to move the substrate material, characterized in that the synthesis module has a plurality of reaction chambers which, as seen in the direction in which the substrate material is moved, are arranged at a particular distance from one another, and in that the control device is designed in such a way that the substrate material can be moved through a distance which corresponds to the spacing of the reaction chambers from one another.

2. Device according to claim 1, characterized in that the transport means comprise a first motor-driven traction means which is arranged behind the region where the substrate material emerges from the synthesis module.

3. Device according to claim 2, characterized in that the transport means comprise a second motor-driven traction means which is arranged in front of the region where the substrate material enters the synthesis module.

4. Device according to claim 2, wherein each traction means has a stepper motor.

5. Device according to claim 1, wherein the synthesis module has sealing lips in the regions where the substrate tape enters and emerges, respectively.

6. Device according to claim 1 wherein each synthesis module comprises at least two module elements which can move relative to one another and are respectively assigned to the upper and lower sides of the substrate tape, at least one module element being connected to an actuating means which can be actuated by the control device and making it possible to releasably press the two module elements tightly against one another.

7. Device according to claim 6, characterized in that reaction chambers are provided in said at least two module elements.

8. Device according to claim 6, wherein the actuating means is a pressure cylinder.

9. Device according claim 1, wherein each reaction chamber has an inlet opening and an outlet opening, via which the reaction chamber communicates with the fluid lines.

10. Device according to claim 9, wherein a connecting channel is provided between at least two neighbouring reaction chambers.

11. A method for the synthesis of oligonucleotides bound to a functionalized substrate material, said method comprising the step of synthesising said oligonucleotides on said substrate material using the device of claim 1 including the steps of transporting said substrate tape into said synthesis module and positioning it, sealing the synthesis module from the outside by pressing the two module elements together, synthesizing the oligonucleotides and then releasing the two module elements from one another, and transporting the substrate tape forward.

12. Device according to claim 10, wherein the reaction chambers and their connecting channels are arranged in meander fashion.

13. A device according to claim 10 wherein the tape-like structure is a polypropylene sheet having a functionalized surface containing hydroxy groups.

14. Process for the automatic synthesis of oligonucleotides on a substrate tape using a synthesis device having a synthesis module comprising at least two module elements, which has a plurality of reaction chambers, in which the substrate tape is transported into the synthesis module and positioned there, the synthesis module is sealed from the outside by pressing the two module elements together, a synthesis step is carried out with the aid of a synthesis machine, the two elements of the synthesis module are then released from one another, and transporting the substrate tape forward through a distance which corresponds to the spacing between two neighbouring reaction chambers, is re-positioned and a further synthesis step is carried out, wherein the transport and positioning of the substrate tape, the pressing of the module elements together, each synthesis step and the releasing of the module elements are controlled and coordinated by a clock signal of the synthesis machine.

15. In a device for the automatic synthesis of oligonucleotides on a tape-like substrate material having at least one synthesis module which can be sealed from the outside and comprises at least one reaction chamber and fluid lines for filling and emptying the reaction chamber with and of reaction media, it being possible to introduce the substrate material into the synthesis module and bring it into contact with the reaction chamber and having transport means which can be actuated by a control device and are intended to move the substrate material, wherein the improvement comprises the synthesis module having a plurality of reaction chambers which, as seen in the direction in which the substrate material is moved, are arranged at a particular distance from one another, and in that the control device is designed in such a way that the substrate material can be moved through a distance which corresponds to the spacing of the reaction chambers from one another.

* * * * *